No. 623,527. Patented Apr. 25, 1899.
T. DUNCAN.
ELECTRIC METER.
(Application filed July 5, 1898.)

(No Model.) 2 Sheets—Sheet 1.

Witnesses: Thomas Duncan Inventor
Samuel A. Bachtel By his Attorneys Chapin & Denny
Loretto A. Noll No. 623,527. Patented Apr. 25, 1899.
T. DUNCAN.
ELECTRIC METER.
(Application filed July 5, 1898.)
(No Model.) 2 Sheets—Sheet 2.

Witnesses: Thomas Duncan Inventor
Samuel R. Bachtel. By his Attorneys Chapin & Denny
Loretta A. Noll

THE NORRIS PETERS CO., PHOTO-LITHO., WASHINGTON, D. C.

UNITED STATES PATENT OFFICE.

THOMAS DUNCAN, OF FORT WAYNE, INDIANA.

ELECTRIC METER.

SPECIFICATION forming part of Letters Patent No. 623,527, dated April 25, 1899.

Application filed July 5, 1898. Serial No. 685,261. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My present invention relates to improvements in induction-motor wattmeters for measuring the energy on alternating-current circuits.

The object of my invention is to provide an improved means for obtaining a current in quadrature with its impressed electromotive force, whereby the meter is adapted to measure the energy in circuits where the current in the translating devices lags behind its electromotive force.

Figure 1:
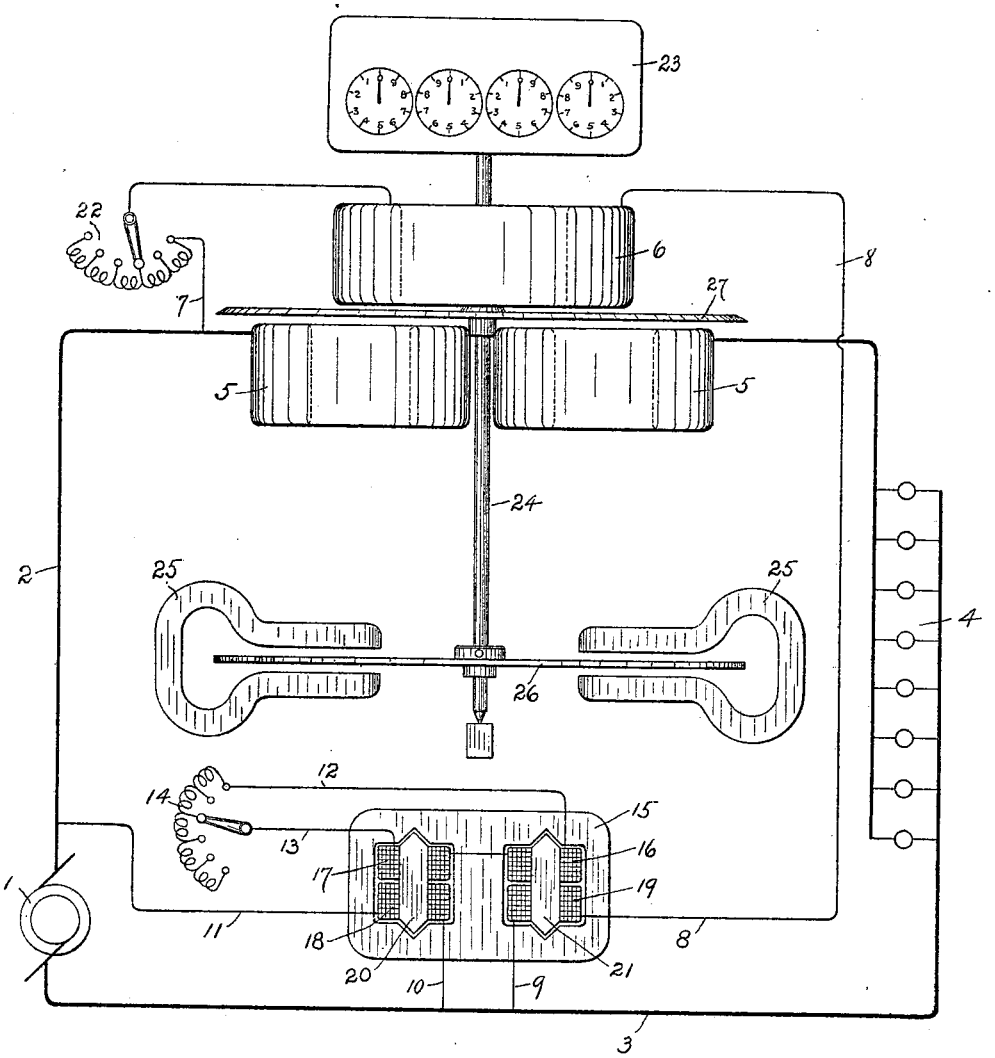
Figure 2:
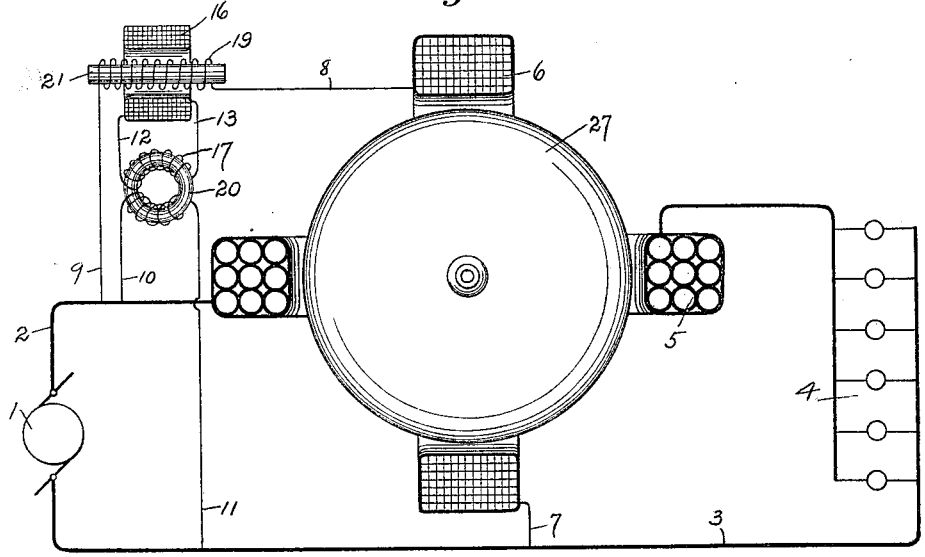
Figure 3:
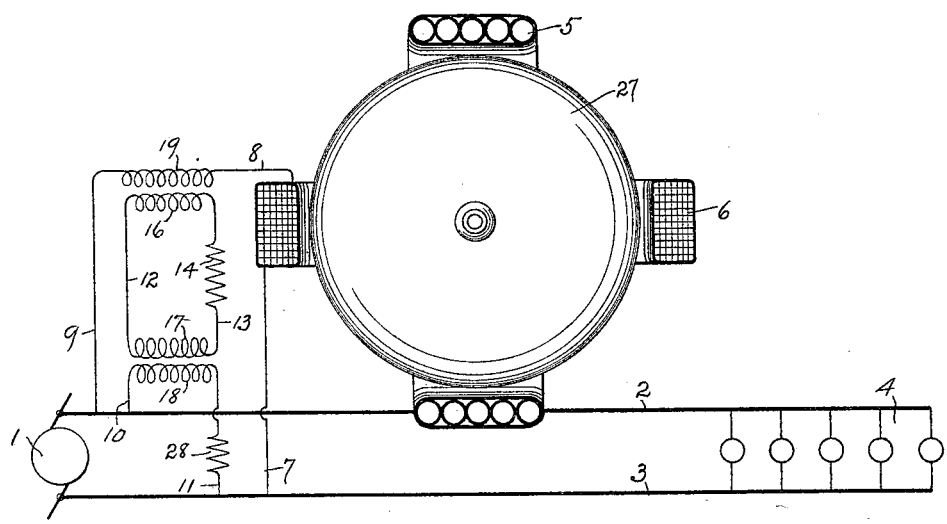

In the accompanying drawings, in which similar reference-numerals indicate like parts throughout, Figure 1 is a front elevation of my improvement, showing the relative arrangement of the energizing-coils, disk armature, registering mechanism, damping device, and the combined transformer and lagging device for obtaining a current in quadrature with its impressed electromotive force. Fig. 2 is a plan view of a modified arrangement of the energizing-coils, shown in horizontal section, and a cylindrical armature, and also showing the lagging device, consisting of a separable transformer and double impedance-coil. Fig. 3 is a similar view to Fig. 2 with the lagging device shown diagrammatically.

My invention comprises the following elements: a source of alternating currents, a series field, a shunt-field, a revoluble closed armature of aluminium, a retarding device comprising another revoluble closed armature embraced by the poles of proper permanent magnets, a revoluble spindle carrying the said closed armatures, a registering mechanism adapted to be actuated by said spindle, and means for lagging the current which represents the electromotive force into quadrature with said electromotive force.

Upon any suitable support the upright revoluble spindle 24 is erected, having suitable bearings at both ends thereof. To the upper end of said spindle is operatively connected a proper registering train or mechanism 23. At a suitable point on said spindle is fixed a metallic armature, which may be disk-like in form, as shown in Fig. 1, or of cylindrical form, as shown in Figs. 2 and 3. When the disk form of armature is employed, the series coils 5 are arranged adjacent to one face thereof and the shunt or volt coil 6 is arranged adjacent to the other face thereof, all of said coils being in inductive relation to said armature, and when the cylindrical form of armature is used the said series and volt coils are arranged at right angles to each other and embracing the said armature, as shown. Near the lower end of said spindle is fixed a metal disk 26, preferably of aluminium, which is arranged between the poles of the permanent magnets 25, thereby forming a magneto-electric drag of common form.

In suitable openings in the iron sheath or envelop are detachably arranged the lagging coil 16 and the impedance-coil 19, having a common laminated iron core 21, and the secondary coil 17 and the primary coil 18, having a common iron core 20.

The operation of my improvement in obtaining a quadrature of the shunt or volt current may be stated as follows: The current which energizes the shunt or volt coil 6 and the impedance-coil 19 is received from the leads 2 and 3 by means of the terminals 7 and 9 and the connecting-wires 8. The said impedance-coil 19 lags the current passing through itself and through the shunt-coil 6 to somewhat less than ninety degrees behind the pressure of the leads 2 and 3, and for well-understood reasons the said current cannot be made to lag exactly ninety degrees by employing an impedance-coil only. To secure the desired lag of said current, I therefore employ another winding or coil 16, mounted upon the same core 21 as the said impedance-coil 19, and supply said coil 16 with current from the secondary coil 17 by means of the wires 12 and 13, which include a variable resistance 14 in series therewith. The secondary currents are generated in the coil 17 by the primary winding 18, which is connected to the mains 2 and 3 by means of the wires 10 and 11, the said coils 17 and 18 being both wound upon the same iron core 20, as shown. The current in the coils 16 and 17 may be varied by varying the resistance 14, thereby modifying the magnetizing effect of the coil 16 until the current in the coil 19 and the shunt-coil 6 is lagged ninety degrees. The resistance 14 may also be used to retard the phase of the current in the coil 6 beyond ninety degrees, if desired, the resistance 22 then being adjusted to bring it to ninety degrees.

The series or ampere coils 5 are traversed by the current supplied to the translating devices 4 by the generator 1. These series coils 5 set up a magnetic field proportional to the current through them, which combines with the lagging magnetic field of the coil 6 to produce a resultant magnetic shifting field which actuates the armature 27 with a torque that is proportional to the energy or watts. To make the speed of the meter proportional to the watts, the usual magneto-electric drag is shown, as described.

In Fig. 2 the primary and secondary coils are wound upon a separate ring-shaped iron core 20, and the core 21, which is common to the lagging coil 6 and the impedance-coil 19, is represented by a straight bar of iron wire; but the form of this bar may be infinitely varied to suit the constructor.

In Figs. 2 and 3 is shown a cylindrical form of armature which is actuated by the necessary coils 5 and 6, arranged at right angles to each other. Fig. 3 also shows a resistance 28 in series with the primary coil 18, which may also be used to adjust the current of the coil 6 to quadrature.

If the current in the series coils 5 is not a lagging current, then it will be in phase with the electromotive force and ninety degrees ahead of the current in the volt-coil 6, thereby enabling the meter to measure inductive loads, because with a given current in said series coils the watts will be proportional to and vary directly as the cosine of the phase-angle between the current and pressure of the work-circuit, and the torque exerted upon the disk armature will vary directly as the sine of the angular displacement between the magnetism of the volt-coil and the series coils 5.

Having thus described my invention, what I desire to secure by Letters Patent is—

1. In an induction-motor meter the combination of a revoluble metallic armature; a series field-coil; a shunt field-coil; an impedance-coil in series with said shunt field-coil; a magnetizing-coil 16 in coöperative relation with the said impedance-coil; a secondary coil 17 supplying currents to the said magnetizing-coil 16; and a primary coil 18 adapted to induce currents in the said secondary.

2. In an induction-motor meter the combination of the series coils carrying the main current; a metallic armature; a shunt-coil carrying a current representing the electromotive force; an impedance-coil in series with the said shunt-coil; a magnetizing-coil in inductive relation to said impedance-coil for augmenting the self-induction of said impedance-coil; and a transformer having its primary winding connected to the source of supply, and having its secondary winding connected in series with the said magnetizing-coil, and adapted to supply currents to the same.

3. The combination in an induction-motor meter of a series field-coil; a shunt or volt coil; an impedance-coil in series with said volt-coil; a revoluble closed-circuit armature in inductive relation to said series and volt coils; a magnetizing-coil in inductive relation to said impedance-coil; a magnetic core common to the magnetizing effects of the said impedance-coil and of the said magnetizing-coil; a transformer supplying currents to the said magnetizing-coil; and a variable resistance in series with the said transformer and the said magnetizing-coil, as described.

4. In an induction-motor meter the combination of a revoluble armature; a series energizing field-coil; a shunt or volt energizing field-coil; a variable resistance in series with said volt field-coil; an impedance-coil in series with the said volt-coil or field and the said variable resistance; a magnetizing-coil in inductive relation to the said impedance-coil for augmenting the self-induction of said impedance-coil; a secondary circuit including a variable resistance and the said magnetizing-coil for the purpose described; a primary circuit in inductive relation to said secondary circuit; and a magnetic core upon which are mounted the said primary and secondary coils.

5. The combination in an induction-motor meter of a series or ampere field-coil; a shunt or volt field-coil; an impedance-coil in series with said volt-coil; a magnetizable core in coöperative relation with said impedance-coil; a magnetizing or phase-changing coil in coöperative relation with said impedance-coil and with said magnetizable core; a primary circuit receiving currents from the supply-mains; a secondary circuit receiving currents by induction from the said primary circuit; a variable resistance in series with the said secondary circuit and the said phase-changing coil; a registering-train; a resistance in series with the said volt and impedance coils; and means for retarding the revolutions of the meter, as and for the purpose described.

6. In an inductive-motor meter, the combination of an ampere or current field coil or coils; a shunt or volt field-coil; a double transformer comprising an outer envelop 15 having two openings, one of which openings contains an iron core provided with a primary coil receiving currents from the supply-mains and also a secondary coil receiving currents from the said primary, the second of said openings containing an iron core provided with a primary lagging coil including in its external circuit the said volt field-coil, and also a phase-changing coil, the said secondary and phase-changing coils being connected in series as and for the purpose described.

Signed by me, at Fort Wayne, Allen county, State of Indiana, this 1st day of July, A. D. 1898.

THOMAS DUNCAN.

Witnesses:
CHARLES C. MILLER,
HARRY M. QUICKSELL.